US005308091A

United States Patent [19]

Mihalcin

[11] Patent Number: 5,308,091
[45] Date of Patent: May 3, 1994

[54] PROTECTIVE BOOT

[76] Inventor: E. Robert Mihalcin, 7605 Egypt Lake Dr., Tampa, Fla. 33614

[21] Appl. No.: 943,890

[22] Filed: Sep. 14, 1992

[51] Int. Cl.⁵ .............................................. F16J 15/52
[52] U.S. Cl. .............................................. 277/212 FB
[58] Field of Search .................. 277/212 FB; 403/50, 403/51; 464/173, 175; 74/18, 18.1, 18.2

[56] References Cited

U.S. PATENT DOCUMENTS

| 3,442,096 | 5/1969 | Orain | 464/175 |
|---|---|---|---|
| 4,114,460 | 9/1978 | Oto | 277/212 FB X |
| 4,278,262 | 7/1981 | Mizutani et al. | 277/212 FB |
| 5,050,894 | 9/1991 | Merel et al. | 277/212 FB X |
| 5,161,454 | 11/1992 | Frasier | 277/212 FB X |

FOREIGN PATENT DOCUMENTS

| 3869 | 9/1979 | European Pat. Off. | 277/212 FB |
|---|---|---|---|
| 2031530 | 4/1980 | United Kingdom | 277/212 FB |

*Primary Examiner*—William A. Cuchlinski, Jr.
*Assistant Examiner*—Scott W. Cummings
*Attorney, Agent, or Firm*—A. W. Fisher, III

[57] ABSTRACT

A protective boot comprising a flexible hollow bellows member configured to operatively house a reciprocating mechanical structure therein to isolate the reciprocating mechanical structure from dust, moisture and other contaminants in the surrounding environment, the flexible hollow bellows, movable between an extended and retracted position, comprises at least two longitudinally compressible sections each comprising a plurality of compressible segments, the two longitudinally compressible sections are separated by a groove or slot such that the longitudinally compressible sections extend and retract independent of each other and wherein the compressible segments in each of the longitudinally compressible sections extend and retract in unison and uniformly to evenly distribute the longitudinal forces exerted on the protective boot during extension and retraction thereof along the entire length of the flexible hollow bellows member.

6 Claims, 5 Drawing Sheets

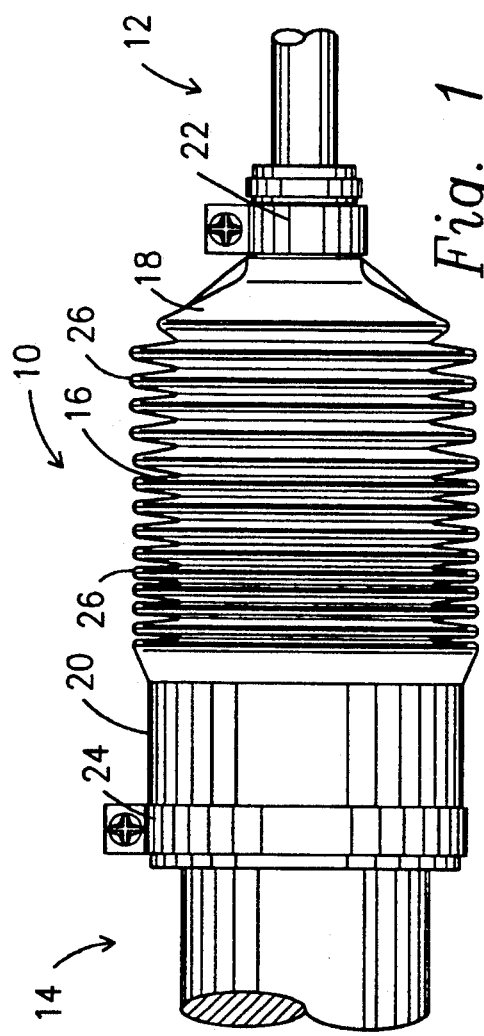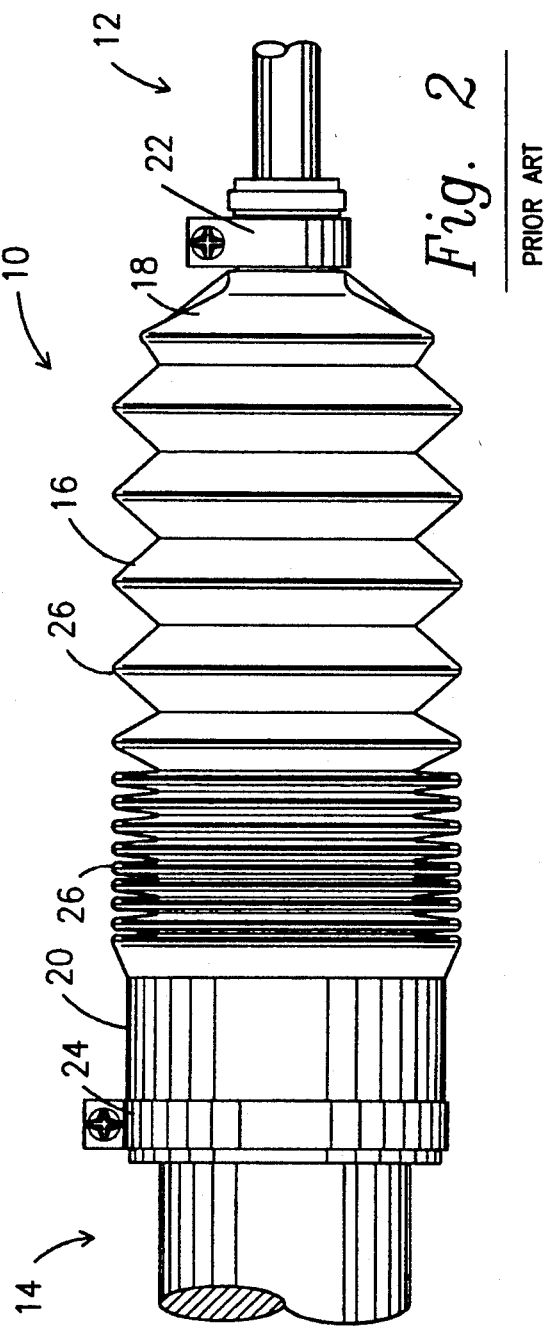

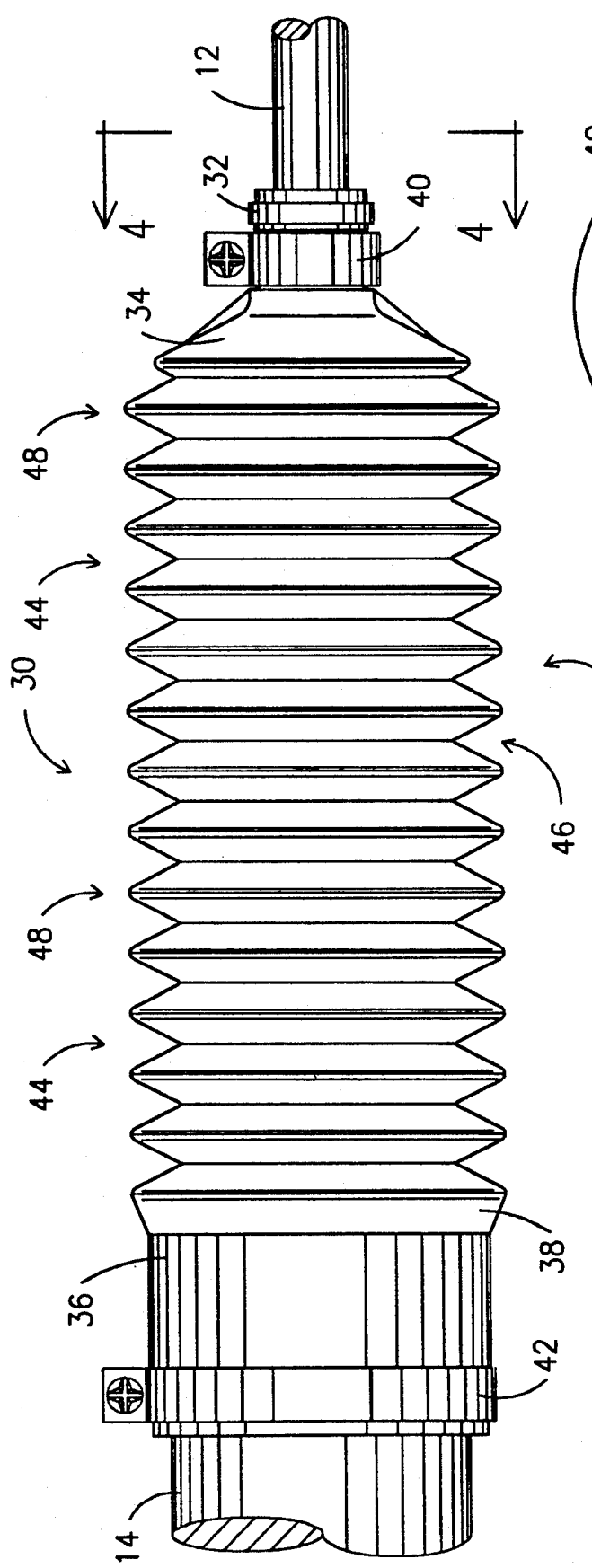
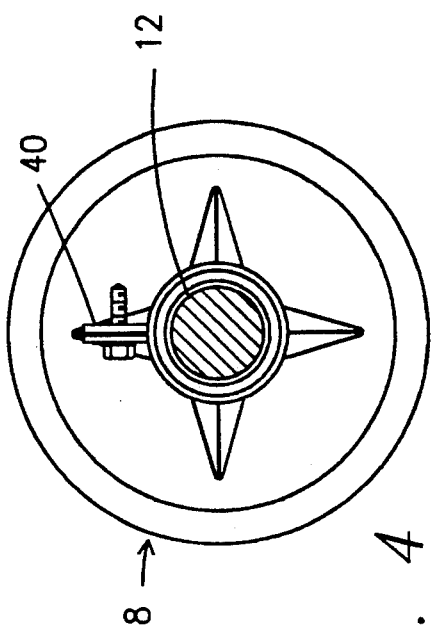
Fig. 3
Fig. 4

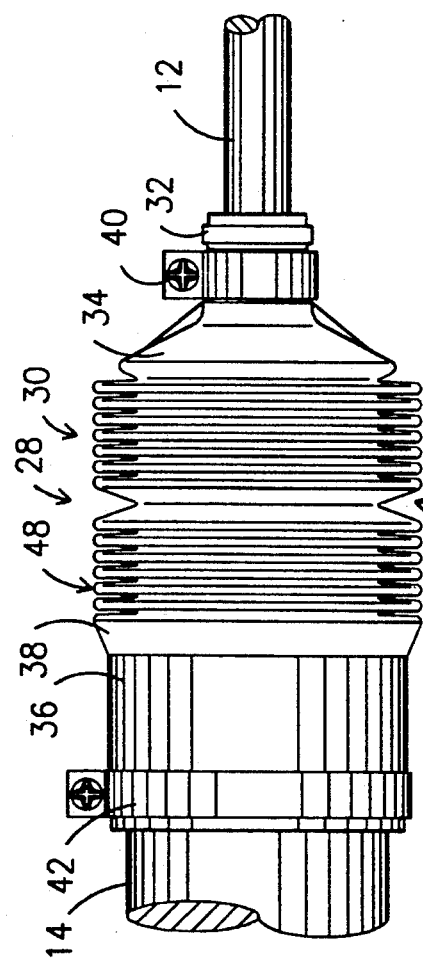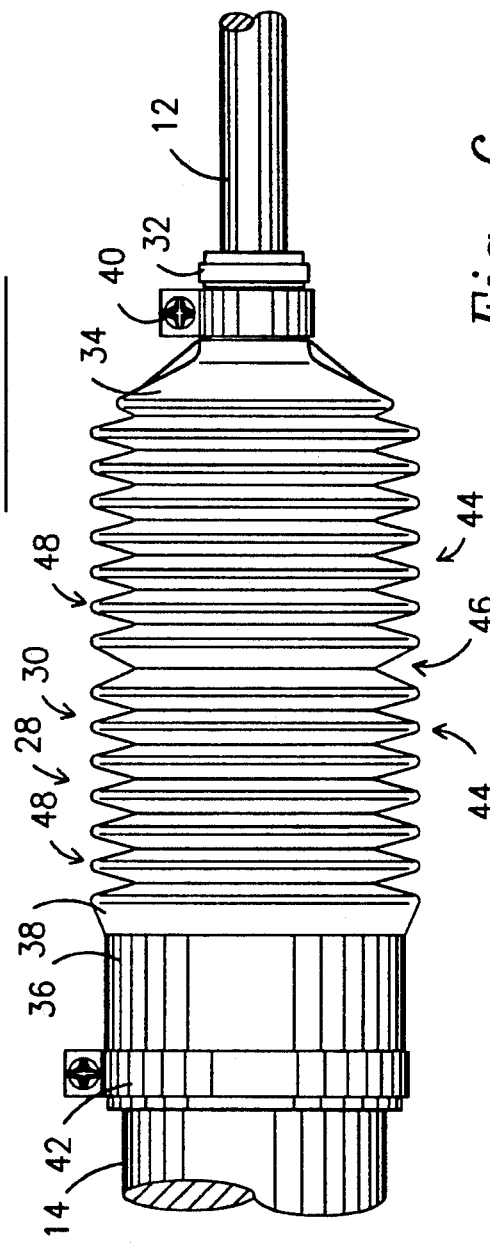

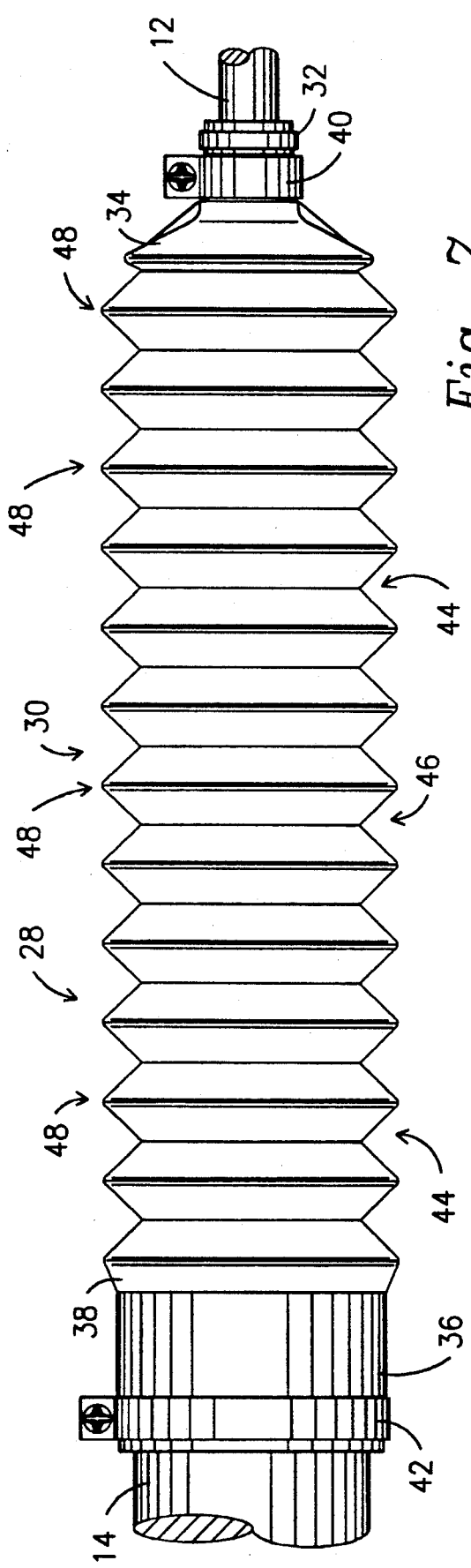
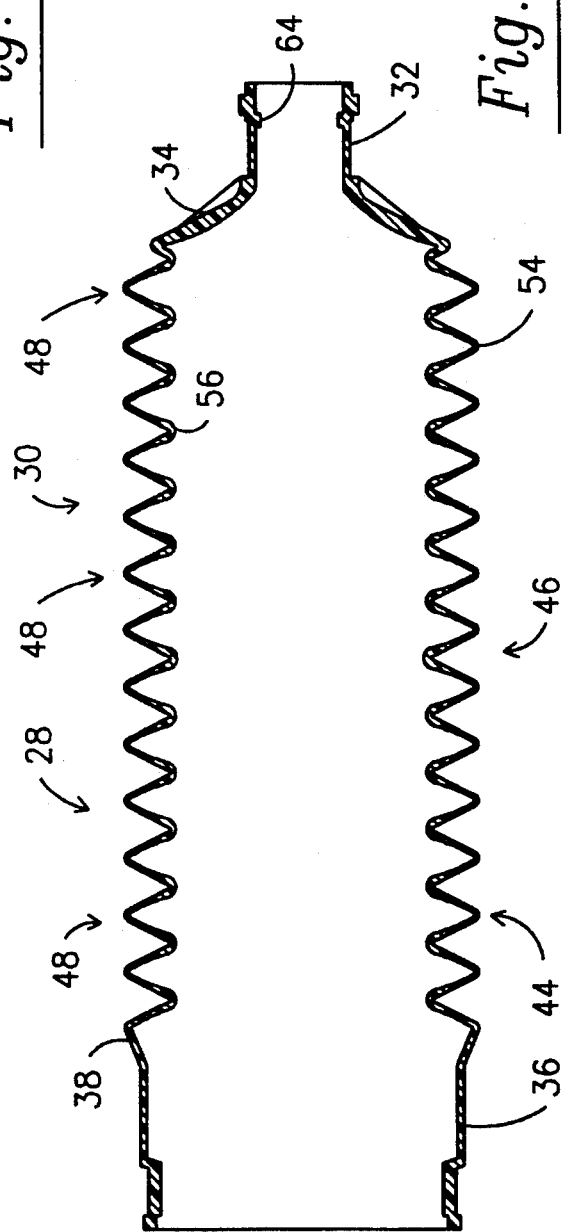

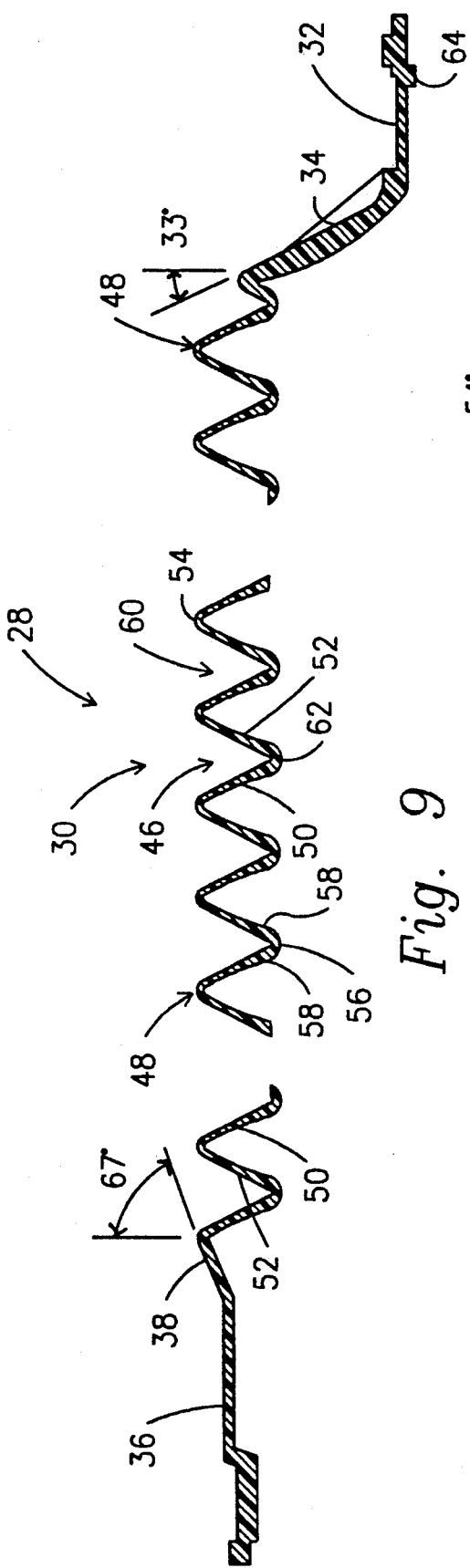
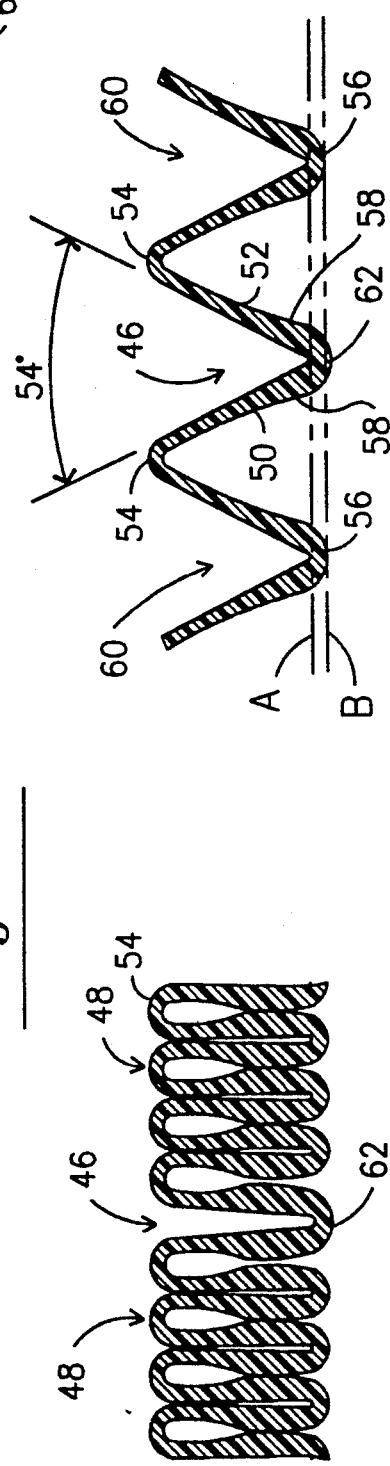
Fig. 9
Fig. 10
Fig. 11

PROTECTIVE BOOT

BACKGROUND OF THE INVENTION

1. Field of the Invention

A protective boot comprising flexible hollow bellows member configured to operatively house a reciprocating mechanical structure therein to isolate and protect the reciprocating mechanical structure from dust, moisture and other contaminants from the surrounding environment.

2. Description of the Prior Art

Tube like flexible boots have been used in numerous automotive, industrial and other applications to protect extendable or reciprocating members from environmental contaminants. Boots used to protect the junction between telescoping members where there is no relative rotational or pivotal movement between the members, may be fixedly secured at both ends. However, when both ends of a boot are fixedly secured to two elements which rotate with respect to one another, substantial twisting stresses are imposed upon the boot. The compression and expansion of the boot in combination with a twisting motion will fatigue the boot more rapidly. A boot split or torn will expose the protected elements to foreign matter and thus defeat the purpose for which a boot was installed.

U.S. Pat. No. 4,529,213 describes an improved boot structure for protecting the extensible member and the adjacent end of a telescopically reciprocal mechanism from contamination including an elongated convoluted body formed of elastomeric material with an integral band on one end thereof with a special split-ring device. The split-ring device is provided with air passages which allow the boot to breathe as the boot expands and contracts in response to similar movements of the telescopically reciprocal mechanism.

U.S. Pat No. 4,735,596 shows a boot with a bellows interposed between a large diameter ring and a small diameter ring. In the bellows, the crest which is the closest to the small diameter ring is made thinner than the other crests. When the boot is mounted on a mechanical shaft joint, the crest closest to the small diameter ring is folded preferentially, so that the pitches of the other crests are maintained. The other crests are not brought into contact with each other during the cross movement of the mechanical shaft joint or even if they come into contact with each other, the contact pressure reduced, and the durability is thereby enhanced.

U.S. Pat. No. 4,730,834 teaches a mechanical shaft joint boot comprising a bellows having a plurality of crests between a large diameter ring and a small diameter ring in which a crest excluding the first crest between the large diameter ring and the center of the bellows has the maximum top curvature radius. The thicknesses of these crests are made uniform and elongation-compression distortion is restrained from being concentrated at their tops. The widening of the tops of the crests also restrains any kinking phenomenon which may be produced. Therefore, the durability of the tops of these crests is increased and the durability of the boot as a whole is hence also increased.

U.S. Pat No. 3,369,411 describes an elongated longitudinally compressible bellows member including opposite end outwardly projecting neck portions provided with aligned bores opening into the interior of the bellows member. One of the neck portions is adapted to be secured to the neck portion of a pumping T and the other of the neck portions is adapted to be secured to an associated pump rod for reciprocation therewith and each of the neck portions including an annular abutment member secured on its inner end and abuttingly engaged with the remote surfaces of the endmost greater dimensioned sections of the bellows member.

U.S. Pat. No. 4,154,434 shows a flexible boot surrounding a piston rod, sealed at one end to the free end portion of the piston rod and at its other end to the rod end of the associated cylinder. The head end of the cylinder is connected to a source of gas under pressure and the interior of the boot communicates freely with the interior of the cylinder at the rod end thereof. A check valve is provided for relieving the pressure in the boot when it reaches a predetermined value.

SUMMARY OF THE INVENTION

The present invention relates to a protective boot configured to operatively house a reciprocating mechanical structure therein to protect the reciprocating mechanical structure from dust, moisture and other contaminants in the surrounding environment.

The protective boot comprises a flexible hollow bellows member movable between an extended and retracted position including at least two longitudinally compressible sections. Each longitudinally compressible section comprises a plurality of compressible segments each including a first and second leg intersecting each other to cooperatively to form an apex. The second leg of the compressible segments within each corresponding longitudinally compressible section intersects the first leg of the next adjacent compressible segment to cooperatively form a base such that a trough is formed between adjacent longitudinally compressible segments when the longitudinally compressible sections are between the retracted and the extended position.

The longitudinally compressible sections are separated by a groove such that the longitudinally compressible sections extend and retract independent of each other. Moreover, the compressible segments in each of the longitudinally compressible sections extend and retract in unison or uniformly to evenly distribute the longitudinal forces exerted on the protective boot during extension and retraction along the entire length of the flexible hollow bellows member. As a result, the force required to expand and compress the flexible hollow bellows member is significantly reduced from state of the art boots. In addition, the useful life of the protective boot is greatly increased due to decreased fatigue stresses.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 1 is a side view of a protective boot of the prior art in the fully retracted or compressed position.

FIG. 2 is a side view of the protective boot of the prior art in a partially extended or expanded position.

FIG. 3 is a side view of the protective boot of the present invention in the neutral position.

FIG. 4 is an end view of the protective boot of the present invention taken along line 4—4 of FIG. 3.

FIG. 5 is a side view of the protective boot of the present invention in the fully retracted or compressed position.

FIG. 6 is a side view of the protective boot of the present invention in a partially extended or expanded position.

FIG. 7 is a side view of the protective boot of the present invention in the fully extended or expanded position.

FIG. 8 is a cross-sectional side view of the protective boot of the present invention in the neutral position as shown in FIG. 3.

FIG. 9 is a partial detailed cross-sectional side view of the protective boot of the present invention in the fully extended or expanded position.

FIG. 10 is a partial detailed cross-sectional side view of the protective boot of the present invention in the fully retracted or compressed position.

FIG. 11 is a detailed cross-sectional side view of several segments of the present invention in the neutral position.

Similar reference characters refer to similar parts throughout the several views of the drawings.

DETAILED DESCRIPTION OF THE PREFERRED EMBODIMENT

FIGS. 1 and 2 show a prior art protective boot generally indicated as 10 constructed of flexible or elastomeric material configured to protect an extendable or reciprocating first member generally indicated as 12 movable relative to a second member generally indicated as 14 to protect the first member 12 from environmental contaminants. The protective boot 10 comprises a compressible hollow bellows member 16 having a proximal hollow coupling member 18 and a distal hollow coupling member 20 formed on opposite ends thereof. The proximal hollow coupling member 18 is affixed to the extendable or reciprocating first member 12 by a first clamp 22; while, the distal hollow coupling member 20 is affixed to the second member 14 by a second clamp 24.

When fully compressed, as shown in FIG. 1, a plurality of segments each indicated as 26 of the compressible hollow bellows member 16 are uniformly compressed along the longitudinal axis of the compressible hollow bellows member 16. FIG. 2 shows the compressible hollow bellows member 16 partially extended between the fully retracted or compressed position as shown in FIG. 1 and the fully extended or expanded position (not shown). As depicted, the expansion or extension of the compressible hollow bellows member 16 is uneven or nonlinear creating a longitudinal drag or force on the compressible hollow bellows member 16.

FIGS. 3 through 11 show the protective boot of the present invention generally indicated as 28. More specifically, the protective boot 28 comprising a flexible hollow bellows or sleeve member generally indicated as 30 configured to operatively house an extendable or reciprocating mechanical structure therein to isolate and protect the extendable or reciprocating mechanical structure from dust, moisture and other contaminants in the surrounding environment. A proximal hollow coupling member 32 and proximal transition portion 34, and a distal hollow coupling member 36 and distal transition portion 38 are formed on opposite ends of the compressible hollow bellows member 30. The proximal hollow coupling member 32 is affixed to the extendable or reciprocating first member 12 by a first clamp 40; while, the distal hollow coupling member 36 is affixed to the second member 14 by a second clamp 42.

The compressible hollow bellows or sleeve 30 comprises at least two longitudinally compressible sections, movable between an extended and retracted position, each generally indicated as 44 separated by a separation means such as a slot or groove 46. Each longitudinally compressible section 44 comprises a plurality of compressible segments each generally indicated as 48 and having a triangular cross-section including a first and second leg indicated as 50 and 52 respectively intersecting each other to cooperatively form an apex 54. The second leg 52 of the compressible segments within each longitudinally compressible section 44 intersects the first leg 50 of the next adjacent compressible segment 48 to cooperatively form a base 56 at the bottom portion 58 of adjacent first and second legs 50 and 52 to cooperatively form a trough 60 formed between adjacent compressible segments 48 when the longitudinally compressible sections 44 are between the retracted and the extended position.

The compressible hollow bellows or sleeve 30 is constructed of resilient elastomeric material to create a longitudinal spring force that tends to return the protective boot 28 to the neutral position as shown in FIGS. 3 and 11. As shown in FIG. 11, the angle formed between adjacent first and second legs 50 and 52 is approximately 54 degrees. As best shown in FIG. 11, the groove 46 results from the enlarged or relatively thick base 62 that increases the resistance to compression.

As shown in FIG. 11, a seal member 64 is formed on the interior surface of the proximal hollow coupling member 32 to form a seal with the extendable or reciprocating first member 12.

The particular structure and configuration of the flexible hollow bellows member 30 permits the longitudinal length thereof when in the extended position (FIG. 7) to be approximately 110% of the longitudinal length when in the neutral position (FIGS. 3 and 11) thus decreasing the fatigue stresses during use.

The longitudinally compressible sections 44 are separated by the groove 46 such that the longitudinally compressible sections 44 extend and retract independent of each other. Moreover, the compressible segments 48 in each of the longitudinally compressible sections 44 extend and retract in unison or uniformly to evenly distribute the longitudinal forces exerted on the protective boot 28 during extension and retraction along the entire length of the flexible hollow bellows member 30. As a result, the force required to expand and compress the flexible hollow bellows member 30 is significantly reduced from state of the art boots. In addition, the useful life of the protective boot is greatly increased due to decreased fatigue stresses. Comparable testing has shown that a state of the art protective boot fails in eight (8) hours; while, the protective boot 28 of the instant invention has not failed in three (3) weeks of twenty-four (24) hour testing.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A protective boot comprising a hollow bellows member configured to operatively house a reciprocating mechanical structure therein to isolate the reciprocating mechanical structure from dust, moisture and other contaminants in the surrounding environment, said hollow bellows member movable between a fully extended and fully retracted position comprising at least two longitudinally compressible sections, each said longitudinally compressible section comprises a plurality of compressible segments, each said compressible segment includes a first leg and a second leg intersecting each other to cooperatively form an apex, said second leg of said compressible section intersects said first leg of a next adjacent compressible segment forming a base to cooperatively form a trough between said adjacent compressible segments, said longitudinally compressible sections are disposed in spaced relationship relative to each other by a separation means comprising an enlarged base to increase the resistance to compression between said longitudinally compressible sections wherein the distance between the longitudinal axis of said hollow bellows member and each said apex is substantially equal and the distance between the longitudinal axis of said hollow bellows member and the base of each said trough is substantially equal and, the distance between the base of each said trough and the longitudinal axis of said hollow bellows member is greater than the distance between the base of said separation means and the longitudinal axis of said hollow bellows member such that said longitudinally compressible sections extend and retract independent of each other and wherein said compressible segments in each of said longitudinally compressible sections extend and retract in unison and uniformly to evenly distribute the longitudinal forces exerted on said protective boot during extension and retraction thereof along the entire length of said hollow bellows member.

2. The protective boot of claim 1 wherein each said compressible segment is substantially triangular in cross-section.

3. The protective boot of claim 1 wherein said hollow bellows or sleeve is constructed of resilient elastomeric material to create a longitudinal spring force that tends to return said protective boot to the neutral position.

4. The protective boot of claim 1 wherein each said trough formed between said adjacent first and second legs is approximately 54 degrees.

5. The protective boot of claim 1 wherein said protective boot further includes a proximal hollow coupling member and a distal hollow coupling member formed on opposite ends thereof wherein a seal member is formed on the interior surface of the proximal hollow coupling member to form a seal with said extendable or reciprocating first member.

6. The protective boot of claim 1 wherein said hollow bellows member permits the longitudinal length thereof when in the extended position to be approximately 110% of said fully longitudinal length when in the neutral position thus decreasing the fatigue stresses during use.

* * * * *